United States Patent
Herrmann et al.

(10) Patent No.: US 7,004,503 B2
(45) Date of Patent: Feb. 28, 2006

(54) SAFETY BELT ARRANGEMENT IN VEHICLES

(75) Inventors: Thomas Herrmann, Weissenhorn (DE); Matthias Pleyer, Senden (DE); Robert Kopetzky, Lonsee (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 157 days.

(21) Appl. No.: 09/969,160

(22) Filed: Oct. 3, 2001

(65) Prior Publication Data

US 2003/0062714 A1 Apr. 3, 2003
US 2004/0239094 A9 Apr. 3, 2003

Related U.S. Application Data

(63) Continuation-in-part of application No. 09/845,323, filed on May 1, 2001, now Pat. No. 6,527,298.

(51) Int. Cl.
*B60R 21/20* (2006.01)

(52) U.S. Cl. .................................. 280/801.2; 280/808
(58) Field of Classification Search .............. 280/801.1, 280/801.2, 808; 297/483, 468
See application file for complete search history.

(56) References Cited

U.S. PATENT DOCUMENTS

| | | | | |
|---|---|---|---|---|
| 4,130,252 A | * | 12/1978 | Mori et al. | 242/378.1 |
| 4,550,933 A | | 11/1985 | Patterson | 280/808 |
| 4,564,219 A | | 1/1986 | Baden et al. | 280/808 |
| 4,796,919 A | * | 1/1989 | Linden | 280/808 |
| 4,799,737 A | | 1/1989 | Greene | 297/468 |
| 4,826,210 A | | 5/1989 | Schmidt | 280/808 |
| 5,139,282 A | | 8/1992 | Mein | 280/808 |
| 5,340,198 A | * | 8/1994 | Murphy et al. | 297/483 |
| 5,609,367 A | | 3/1997 | Eusebi et al. | 280/808 |
| 5,775,732 A | * | 7/1998 | Grau | 280/808 |
| 5,799,971 A | | 9/1998 | Asada | |
| 5,906,395 A | | 5/1999 | Isaji et al. | |
| 5,924,724 A | | 7/1999 | Nakamura et al. | |
| 6,244,626 B1 | * | 6/2001 | Monaghan et al. | 280/805 |
| 6,527,298 B1 | * | 3/2003 | Kopetzky | 280/806 |

FOREIGN PATENT DOCUMENTS

| | | |
|---|---|---|
| DE | 3139624 | 4/1983 |
| DE | 196-29-366 | 1/1998 |
| EP | 0 768 215 A2 | 4/1997 |
| EP | 0 888 936 | 1/1999 |

\* cited by examiner

*Primary Examiner*—David R. Dunn
(74) *Attorney, Agent, or Firm*—Foley & Lardner LLP (57) ABSTRACT

A safety belt arrangement for a motor vehicle. The arrangement includes a belt deflection device. The belt deflection device is arranged above the shoulder of the passenger to be held by the safety belt. The belt deflection device is mounted to a carrier attached to the vehicle body. The belt deflection device includes an upper reversal member, which deflects the belt downwards, and a deflection member arranged below the reversal member. The deflection member being vertically adjustably secured to a rail mounted to the carrier. The deflection member deflects the belt from an at least substantially vertical direction to a direction toward the shoulder of the passenger which deviates significantly from the vertical.

14 Claims, 6 Drawing Sheets

SAFETY BELT ARRANGEMENT IN VEHICLES

CROSS-REFERENCE TO RELATED APPLICATIONS

The present application is a continuation-in-part of U.S. patent application Ser. No. 09/845,323 filed on May 1, 2001 (now U.S. Pat. No. 6,527,298).

BACKGROUND

The present invention relates to a safety belt arrangement for a vehicle, in particular a motor vehicle. In particular, but not exclusively, the present invention relates to a three-point safety belt arrangement. The present invention may also be employed in a two-point safety belt arrangement.

In conventional arrangements a belt deflection device is provided above a belt roller, which is preferably secured at the base of the vehicle. In order to improve passenger comfort the belt deflection device may be displaceable in the vertical direction so that taller persons can displace the deflection location upwardly and shorter persons can displace the deflection location downwardly. In this way the belt part which extends from the belt deflection device to the person who is buckled in arrives at the shoulder of the passenger at an angle which is not too steep and not too acute. Due to the angle, the draw-back forces which are exerted on the belt by the torque producing mechanism, which is preferably executed as a spiral spring in the belt roller, do not exert any unpleasant force components on the shoulders toward the rear. However, an unobjectionable holding of the passenger against the inertial forces is ensured in the event of sudden braking and in particular in the event of an accident.

Current belt deflection devices are required to withstand considerable forces during fall braking and, in particular, in the event of an accident. As a result, the displacement mechanisms must be designed to be particularly stable and strong, which is associated with increased material and construction costs and complexity. In contrast, there is no problem in securing belt deflection devices which are not adjustable in height to the vehicle, so that no danger of tearing out exists even in the event of an accident.

SUMMARY OF THE INVENTION

The object of the invention is to create a safety belt apparatus having a belt deflection device which is adjustable in height, and which operates absolutely reliably even in the event of an accident. The apparatus operates in a simple manner and can be provided for low material cost and complexity. Another object of the invention is to provide a safety belt arrangement which has a simple construction and can be mounted to a vehicle body in a simple manner.

According to the present invention a seat belt arrangement is provided. The arrangement includes a turn-about or reversal member secured to the vehicle body for reversing the direction of the seat belt. The height of the seat belt arrangement may be adjusted by moving a vertically adjustable deflection member which is arranged below the reversal member at the vehicle body and which does not deflect the belt from the vertical at an angle as great as 90°, or even in the region of 180°, but merely by a comparatively small angle of approximately 45°.

The forces transmitted by the belt to the deflection member in the event of an accident are substantially lower than the stresses arising at the reversal member, which is firmly arranged, so that the deflection member can be manufactured with relatively low volume and with relatively low material cost and complexity. As a result, the deflection member takes up little space and projects only comparatively little into the passenger space.

The greatest part of the belt draw force is transmitted to the vehicle body through the reversal member, which can be firmly mounted (via the carrier) without difficulty. The substantially lower deflection forces at the deflection member are also transmitted to the vehicle body via the carrier.

Moreover, since the reversal member as well as the belt deflection member are mounted to a carrier (in the case of the deflection member via the rail), installation of the safety belt arrangement in a vehicle is simplified. Further, it is advantageous that all forces which may act on the deflection member and, in particular, on the reversal member, are transmitted to the vehicle via the carrier. The load which may act on the vehicle body is concentrated in the location where the carrier is attached, which makes it easier to provide any strengthening of the vehicle body, if required.

Preferably, the upper reversal member is mounted directly above the top end of the rail. Thereby, the vertical extension of the carrier is limited so that installation of the belt arrangement is further simplified.

In another preferred embodiment of the invention, the rail is arranged to extend in-between the part of the belt extending from the belt roller to the reversal member and the part of the belt extending from the reversal member to the deflection member. Thereby, the dimensions of the deflection device are reduced so that the carrier can be easily integrated in a column if the vehicle body with only the exit of the belt from the deflection member and an actuator for height adjustment being exposed.

In another embodiment, the deflection member comprises a holding element which is engagable with the rail through spring force. Thereby, the deflection member can be easily engaged and disengaged to adjust a preferred height.

In still a further embodiment, the carrier comprises a plurality of latches for attaching the carrier to the vehicle body, and in particular a column of the vehicle.

The deflection member may further comprise a bracket for receiving and guiding the safety belt. Preferably, the bracket is at an angle relative to the longitudinal axis of the carrier. The angle may preferably be approximately 45°. Thereby, the belt approaches the shoulder of a passenger to be held by the belt in a most comfortable manner. The rail can be advantageously designed as an extrusion section.

One advantage of the invention consists in that the safety belt arrangement does not completely fail even if the deflection member in accordance with the invention should break in the event of an accident. Since the deflection member does not reverse the belt, but merely deflects it, a straightening of the deflected belt part takes place in the event of a breaking of the deflection member, through which however the holding function of the belt merely sets in with a slight delay but is not completely eliminated, however.

The deflection member is preferably suitable rounded off at the inside and at the outside in such a manner that the belt is neither excessively stressed or even damaged during the drawing in and out nor are persons whose heads strike against the deflection member exposed to a serious risk of injury. The deflection member may be executed as a plastic and/or metal part.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
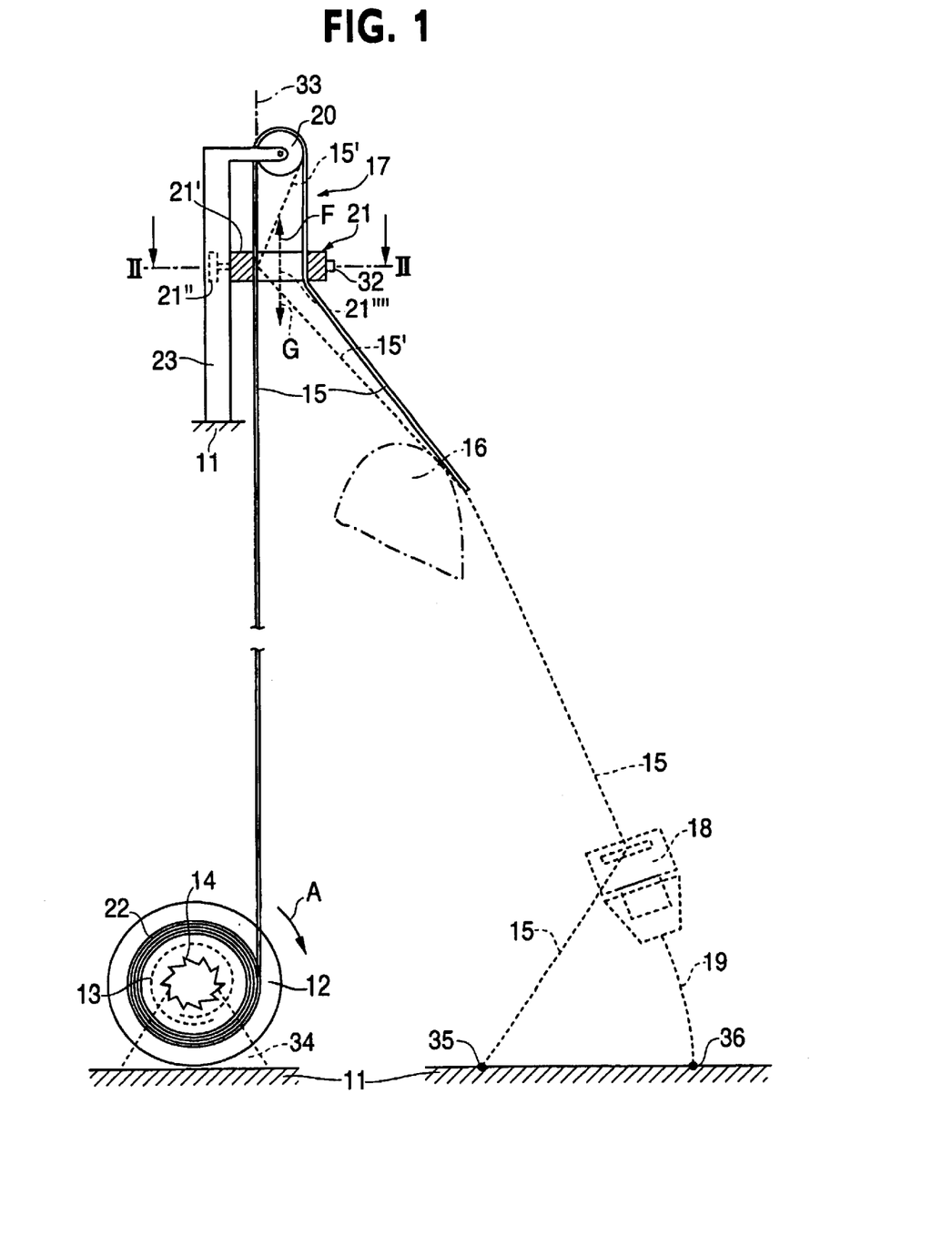
FIG. 1 is a schematic side view of a safety belt arrangement in accordance with a first embodiment of the invention in a motor vehicle.

As shown in FIG. 1, a seat belt arrangement according to the present invention includes a belt roller 12 which takes up a belt coil or roll 22 and is secured to the base of a vehicle body 11 by means of a housing 34, which is merely indicated in FIG. 1 by broken lines. The belt roller 12 is subjected to a bias force in the wind-up direction A by a torque producing mechanism 13 (shown in dashed lines), preferably in the form of a spiral spring. An unwind blocking arrangement or ratchet 14 (shown only schematically) ensures that the unwinding of the belt 15 from the belt roller 12, which is theoretically possible against the restoring force of the torque producing mechanism 13, is inhibited by the rotational blocking of the belt roller 12. The belt unwinding is blocked if an attempt is made to unwind the belt 15 rapidly from the belt roller 12 or if accelerations which are caused by an accident arise at the vehicle.

From the belt roller 12 the belt 15 first extends upwardly substantially in the direction of the vertical 33 up to a belt deflection device 17 which is provided above the shoulder 16 of a passenger. The belt deflection device 17 includes an upper reversal member 20 which is firmly secured to the vehicle body 11 and is preferably designed as a roller. The deflection device 17 also includes a height-adjustable deflection member 21 which is arranged beneath the roller. The reversal member 20 is configured to deflect the belt 15 by at least 180°, or preferably somewhat more (see the illustration in broken lines in FIG. 1). On the other hand, the deflection member 21 merely produces a deflection of the belt 15 that is above the shoulder 16 of the passenger by an angle which is approximately 45°, depending on the size of the passenger.

After passing the shoulder 16 of the passenger, the belt 15 then arrives at a belt lock 18 where it is secured (as shown by the broken lines in FIG. 1). The lower part of the belt lock 18 is led over a draw member 19 to a draw member securing point 36 at the vehicle body 11. Alternatively, in the case of a three-point arrangement, the belt 15 is led further to a belt securing point 35 at the vehicle body 11.

Figure 2:
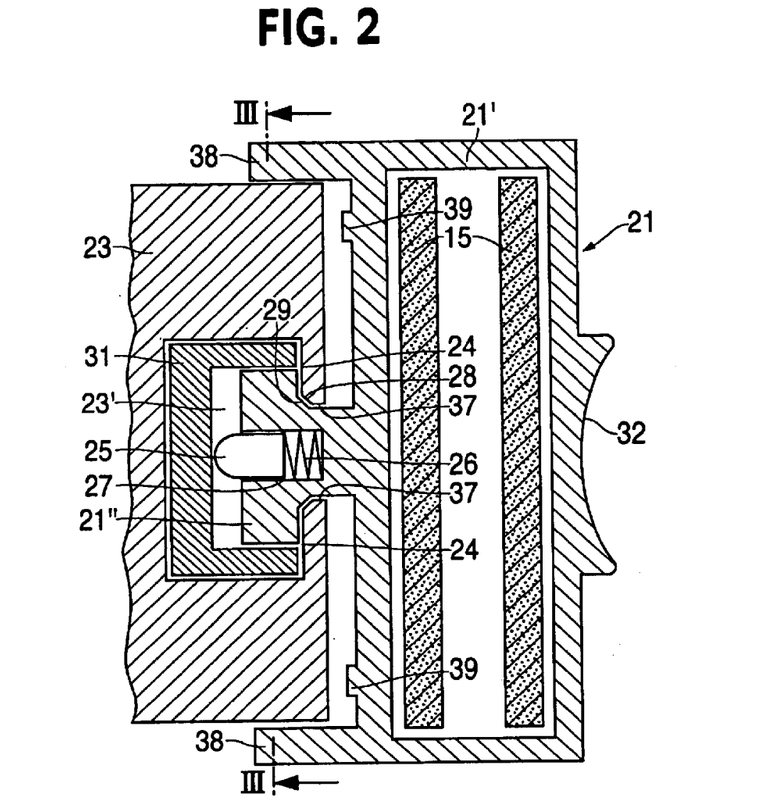
FIG. 2 is an enlarged cross-sectional schematic view along line II—II in FIG. 1.
Figure 3:
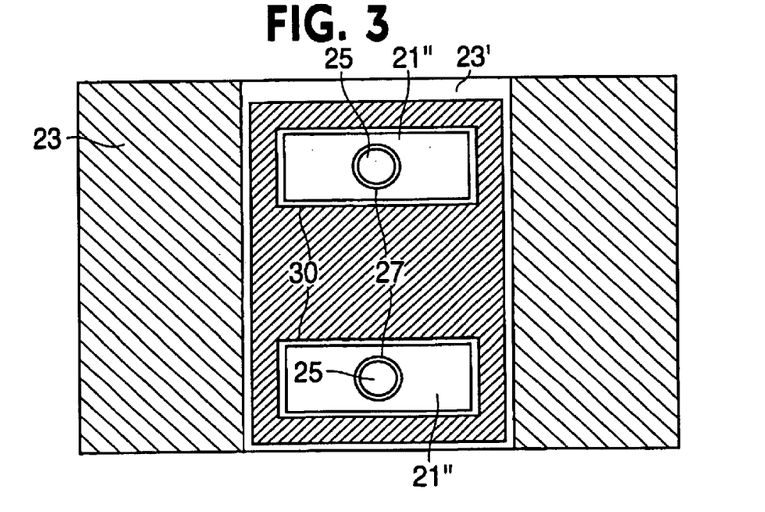
FIG. 3 is a section along line III—III in FIG. 2.

In accordance with FIGS. 1 to 3, the deflection member 21 includes a frame 21', preferably rectangular, from which two spaced sliding blocks 21" (spaced in a vertical direction) extend in the direction away from the safety belt 15 through an entry opening 37 into a groove 23' of a rail 23. The rail 23 is secured to the vehicle body 11 and extends in a generally vertical direction. The sliding blocks 21" are configured generally in a T shape and engage with a transverse T beam behind undercuttings 24 of the rail 23 that adjacent the groove 23'. At the end of the undercuttings 24 which faces the entry opening 37 inclined clamping surfaces 28 are provided which lie opposite to corresponding inclined clamping surfaces 29 at the sliding blocks 21".

At the side facing away from the frame 21' the two sliding blocks 21", which have a spacing in the longitudinal direction of the rail 23, as shown in FIG. 3. The spacing or blind bore 27 accommodates a compression spring 26 and a recoil pin 25 which is subject to the spring force. The two recoil pins 25 project out of the blind bores 27 and push against a carriage 31 which is formed complementary to the groove 23' and which has at the side of the frame 21' two rectangular openings 30 into which the sliding blocks 21", which have a rectangular cross-section which is complementary thereto, engage.

The carriage 31 is pressed into the groove 23' by the compression springs 26 and the recoil pins 25. The reaction force which results from this contact brings the inclined clamping surfaces 28, 29 into a clamping contact with one another, through which the deflection member 21 is clamped at the rail 23 in such a manner that a vertical position which is set is maintained.

If the passenger presses with a finger into an actuation depression 32 which is provided outwardly at the frame 21', the inclined clamping surfaces 28, 29 are lifted off from one another, with the compression spring 26 being compressed. As a result of the passenger's action, the force locked connection between the sliding blocks 21" and the rail 23 is loosened to such an extent that an upward or downward vertical displacement of the deflection member 21 in the direction of the arrows F and G shown in FIG. 1 is possible.

Ripplings or surface features may be provided at the inclined clamping surfaces 28, 29 in order to improve the holding of the deflection member 21. The displacement can take place continuously or, if non-illustrated catches are provided, also in accordance with a predetermined pattern.

In a preferred embodiment, in order to allow the deflection member 21 to project as little as possible into the passenger space, the safety belt 15, after passing around the reversal member 20 in the manner which is illustrated in FIG. 1 at 15', should be directed towards the part of the belt 15 which is located between the belt roller 12 and the reversal member 20 so that the two belt parts have only just enough spacing inside the deflection member 21 to ensure their mutual movability. Both the rising and the descending part of the belt 15 are passed through the frame 21'. Thus, through a guiding of the belt in accordance with 15' in FIG. 1 the depth of the deflection member 21 can be reduced to a minimum. The frame could be designed substantially flatter in this case, as is indicated at 21''', in FIG. 1.

A passenger displaces the deflection member 21 by pressing the actuation depression 32 relative to his shoulder 16 at such a height that the belt 15 or 15' is on the one hand deflected only as little as possible from its straight direction, through which a higher wearer comfort is ensured, but on the other hand the belt 15 is nevertheless wound up to such an extent in the region of the shoulder 16 that a good holding of the buckled up passenger against being thrust forward is ensured in the event of a sudden braking or in the event of an accident. Taller persons thus displace the deflection member 21 further upwardly and shorter persons further downwardly.

The two forces resulting from the upwardly and downwardly extending belt portions located at the reversal member 20 can be easily accommodated by the non-displaceable mounting of the reversal member at the vehicle body 11. On the contrary, only a fraction of the simple belt force arises at the deflection member 21. This fractional belt force is in the direction away from the rail 23. This fraction is determined by the comparatively small size of the deflection angle of the belt 15 (preferably, approximately 45°) in the deflection member 21. The force acting on the deflection member 21 can thus, for example, be reduced to less than half the belt force. This reduction in force on the deflection member provides the advantage of permitting a deflection member with a compact design that can be made with a low material cost and complexity.

In accordance with FIG. 2, covering aprons 38 which cover over the rail 23 and which counteract the intrusion of contamination between the frame 21' and the rail 23 can be formed laterally at the frame 21'. The covering aprons 38 are omitted in FIG. 3.

Figure 4:
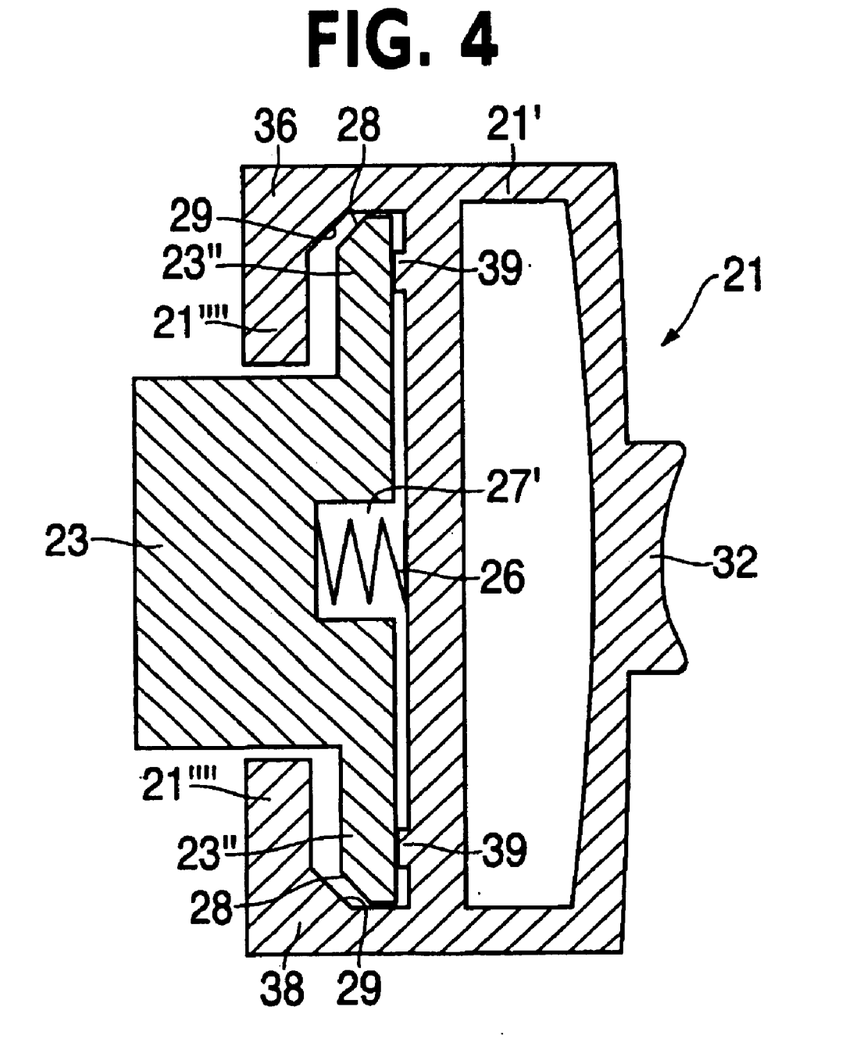
FIG. 4 is a cross-sectional schematic view similar to FIG. 2 of a further embodiment of the present invention.

According to an alternative embodiment of the present invention, FIG. 4 essentially shows a kinematic reversal of the guidance of the deflection member 21 at the rail 23 than that shown in FIGS. 2 and 3. The rail 23 is provided in accordance with FIG. 4 with a T-shaped section instead of with a groove 23' in accordance with FIG. 3, with the two transverse projections 23" of the rail 23 engaging behind undercuttings 21"" of the deflection member 21 which are arranged at the covering aprons 38 of the frame 21' which point towards the rail 23. The inclined clamping surfaces 28 and 29 are respectively provided at the free ends of the transverse projections 23" and in the region of the transition from the covering aprons 38 to the undercuttings 21"". In a mounting bore 27' of the rail 23 there is a helical compression spring 26 which engages at the other side at the base of the frame 21' and exerts a bias force on the deflection member 21 in the direction away from rail 23. In this way the inclined clamping surfaces 28, 29 come to lie in contact with one another. In FIG. 4 the deflection member 21 is illustrated in a condition resulting from a passenger pressing on the actuation depression 32 in order to be able to displace the deflection member 21 along the rail 23.

Both in the exemplary embodiment in accordance with FIG. 2 and the exemplary embodiment in accordance with FIG. 4, sliding projections 39 can be provided at the rear side of the frame 21'. The projections 39 are normally held by the helical compression spring 26 at a distance from the rail 23, but come to contact at the rail 23 when pressure is exerted on the actuation depression 32 and which then favour the upward or downward sliding process which is triggered by the operating person.

Figure 5:
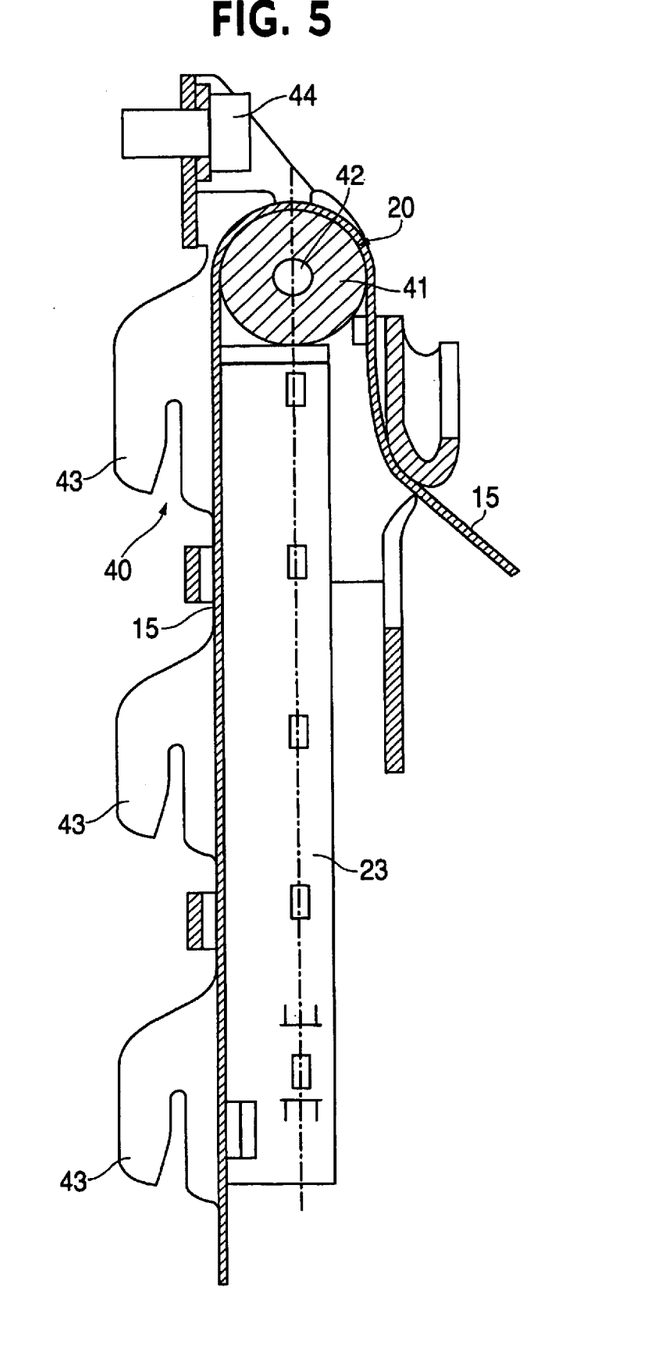
FIG. 5 is a cross section of a safety belt arrangement in accordance with a further embodiment of the invention.
Figure 6:
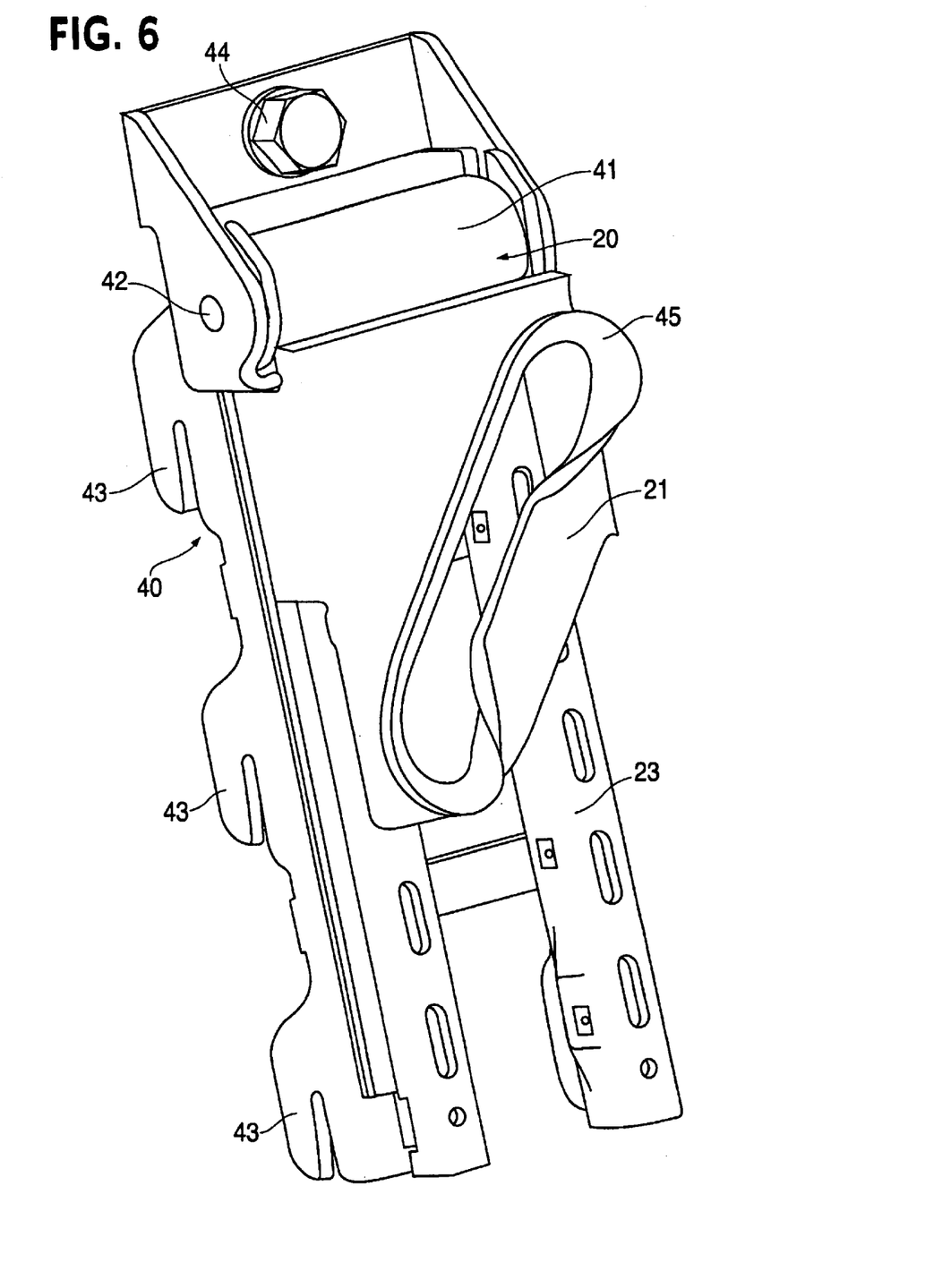
FIG. 6 is a perspective view of the safety belt arrangement of FIG. 5.
Figure 7:
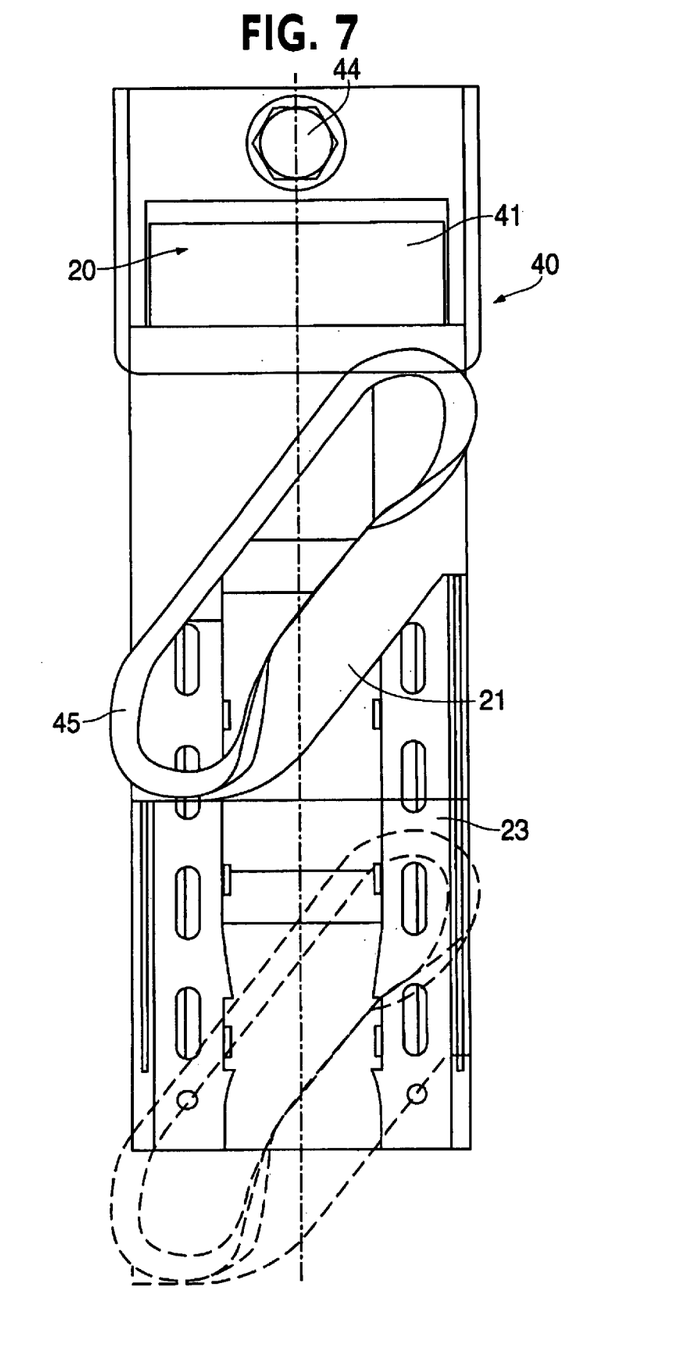
FIG. 7 is a front view of the safety belt arrangement of FIGS. 5 and 6.

FIGS. 5 to 7 show a safety belt arrangement in accordance with another embodiment of the invention. In this embodiment, the reversal member 20, the deflection member 21 as well as the rail 23 are mounted to a carrier 40. The reversal member 20 is formed by a reversal roller 41 rotatably held on an axis 41 on a top part of the carrier 40. The rail 23 extends in between the belt part extending from the belt roller 12 to the reversal member 20, and the belt part extending from the reversal member 20 to the belt lock 18. As has been indicated hereinabove, this reduces the dimensions of the safety belt arrangement in particular in the direction of the passenger cabin of the vehicle in which the arrangement is to be installed. This facilitates an integration of the arrangement in a column (in particular the B-column) of the vehicle.

The carrier 40 further comprises a plurality of latches 43 for attachment of the carrier 40 to the vehicle body 11. Additional means such as screws or bolts 44 may be provided to better secure the carrier 40 to the vehicle body 11.

The deflection member 21 further comprises a bracket 45 for guiding the safety belt 15. The bracket 45 is at an angle to the longitudinal extension of the carrier 40. Thereby, the deflection of the safety belt 15 is such that the belt 15 approaches the shoulder of a passenger in a most comfortable manner.

It is to be noted that the present invention is not limited to the exemplary embodiments described above. It will be apparent to the skilled person that modifications and variations can be made without departing from the scope and spirit of the invention as determined from the claims.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety belt arrangement for a motor vehicle comprising:
   a safety belt;
   a belt roller rotatably secured at the vehicle body, the belt roller being biased in the belt wind-up direction and including a blocking mechanism to prevent the unwinding of the belt in the event that a rapid draw out the belt is attempted;
   a belt deflection device arranged above the shoulder of a passenger of the vehicle who is to be held by the safety belt, the belt deflection device receiving the belt from the roller and deflecting the belt toward the passenger;
   a belt lock attached to the vehicle body to which the belt extends from the belt deflection device; and
   a carrier attached to the vehicle body, to which the belt deflection device is mounted;
   wherein the belt deflection device includes an upper reversal member, which deflects the belt downwards, and a deflection member arranged below the reversal member and is secured to a rail mounted to the carrier so that the deflection member is vertically adjustable, wherein the upper reversal member is mounted to the carrier at the vertical top end of the rail and the deflection member is configured to deflect the belt from a substantially vertical direction to a direction toward the shoulder of the passenger which deviates significantly from the vertical.

2. The arrangement of claim 1, wherein the deflection member comprises a bracket for guiding the belt received therein.

3. The arrangement of claim 2, wherein the bracket extends at an angle relative to the longitudinal axis of the rail.

4. The arrangement of claim 3, wherein said angle is approximately 450°.

5. The arrangement of claim 1, wherein the reversal member comprises a roller.

6. The arrangement of claim 1, wherein the belt extends substantially vertically from the belt roller to the reversal member.

7. The arrangement of claim 1, wherein the part of the belt which extends between the reversal member and the deflection member extends at least substantially vertically.

8. The arrangement of claim 1, wherein the two parts of the belt which extend between the reversal member and the deflection member extend at least substantially parallel to one another.

9. The arrangement of claim 1, wherein the deflection member includes a plurality of vertical positions.

10. The arrangement of claim 1, wherein the deflection member includes plastic or metal.

11. The arrangement of claim 1, wherein the rail comprises a metal section.

12. The arrangement of claim 1, wherein the belt is deflected below the deflection member by an approximately 45° angle with respect to the part of the belt which is located directly ahead of the deflection member.

13. A safety belt arrangement for a motor vehicle comprising:
   a safety belt;
   a belt roller rotatably secured at the vehicle body, the belt roller being biased in the belt wind-up direction and including a blocking mechanism to prevent the unwinding of the belt in the event that a rapid draw out the belt is attempted;
   a belt deflection device arranged above the shoulder of a passenger of the vehicle who is to be held by the safety belt, the belt deflection device receiving the belt from the roller and deflecting the belt toward the passenger;
   a belt lock attached to the vehicle body to which the belt extends from the belt deflection device; and
   a carrier attached to the vehicle body, to which the belt deflection device is mounted;
   wherein the belt deflection device includes an upper reversal member, which deflects the belt downwards, and a deflection member arranged below the reversal member and is secured to a rail mounted to the carrier so that the deflection member is vertically adjustable, wherein the rail is arranged to extend between the part of the belt extending from the belt roller to the reversal member and the part of the belt extending from the reversal member to the deflection member and the deflection member is configured to deflect the belt from a substantially vertical direction to a direction toward the shoulder of the passenger which deviates significantly from the vertical.

14. A safety belt arrangement for a motor vehicle comprising:
   a safety belt;
   a belt roller rotatably secured at the vehicle body, the belt roller being biased in the belt wind-up direction and including a blocking mechanism to prevent the unwinding of the belt in the event that a rapid draw out the belt is attempted;
   a belt deflection device arranged above the shoulder of a passenger of the vehicle who is to be held by the safety belt, the belt deflection device receiving the belt from the roller and deflecting the belt toward the passenger;
   a belt lock attached to the vehicle body to which the belt extends from the belt deflection device; and
   a carrier attached to the vehicle body, to which the belt deflection device is mounted wherein the carrier comprises a plurality of latches for attaching the carrier to the vehicle body;
   wherein the belt deflection device includes an upper reversal member, which deflects the belt downwards, and a deflection member arranged below the reversal member and is secured to a rail mounted to the carrier so that the deflection member is vertically adjustable, wherein the deflection member is configured to deflect the belt from a substantially vertical direction to a direction toward the shoulder of the Passenger which deviates significantly from the vertical.

* * * * *